(12) United States Patent
Kenyon et al.

(10) Patent No.: US 10,480,981 B2
(45) Date of Patent: Nov. 19, 2019

(54) SELF-DRAINING MOUNT HEAD FOR TRANSMITTER

(71) Applicant: Dieterich Standard, Inc., Boulder, CO (US)

(72) Inventors: Nathaniel Kirk Kenyon, Westminster, CO (US); John Henry Stehle, Erie, CO (US); Bryce Arthur Bingham, Boulder, CO (US); Chad Andrew Steffl, Longmont, CO (US); Gregory Robert Strom, Boulder, CO (US)

(73) Assignee: DIETERICH STANDARD, INC., Boulder, CO (US)

( * ) Notice: Subject to any disclaimer, the term of this patent is extended or adjusted under 35 U.S.C. 154(b) by 249 days.

(21) Appl. No.: 15/608,007

(22) Filed: May 30, 2017

(65) Prior Publication Data

US 2018/0345168 A1 Dec. 6, 2018

(51) Int. Cl.
*G01F 15/18* (2006.01)
*G01F 1/38* (2006.01)
(Continued)

(52) U.S. Cl.
CPC .......... *G01F 15/185* (2013.01); *B01D 5/009* (2013.01); *F16L 23/024* (2013.01); *F16L 23/032* (2013.01); *G01F 1/34* (2013.01); *G01F 1/363* (2013.01); *G01F 1/366* (2013.01); *G01F 1/383* (2013.01); *G01F 1/386* (2013.01); *G01F 15/10* (2013.01); (Continued)

(58) Field of Classification Search
CPC ... G01L 19/0015; G01L 19/003; G01L 19/14; Y10T 137/87249; Y10T 137/87885; Y10T 137/5196; G01F 15/185; G01F 1/34; G01F 15/18; G01F 1/363; G01F 1/366; G01F 1/383; G01F 1/386; B01D 5/009
See application file for complete search history.

(56) References Cited

U.S. PATENT DOCUMENTS 5,823,228 A * 10/1998 Chou .................... F16K 27/003
137/597
5,832,956 A * 11/1998 Nimberger .............. F16K 11/22
137/597

(Continued)

FOREIGN PATENT DOCUMENTS

WO  WO 2013/184554   12/2013
WO  WO 2016/099968   6/2016

OTHER PUBLICATIONS

Notification of Transmittal of the International Search Report and the Written Opinion of the International Searching Authority from PCT/US2018/032066, dated Sep. 14, 2018.

*Primary Examiner* — Atif H Chaudry
(74) *Attorney, Agent, or Firm* — Westman, Champlin & Koehler, P.A.

(57) ABSTRACT

A self-draining transmitter mount head includes a head body with a transmitter process coupling port in the head body, an impulse port in the head body, and an impulse passage coupled to the impulse port. An impulse drain passage is coupled between the pressure transmitter port and the impulse passage. The impulse drain passage is positioned at an angle to the impulse passage, and relative to a head installation angle that positions the impulse drain passage to drain away from the transmitter process coupling port through a range of head installation angles.

20 Claims, 9 Drawing Sheets

(51) Int. Cl.
*G01L 19/14* (2006.01)
*G01F 15/10* (2006.01)
*G01L 19/06* (2006.01)
*G01F 1/36* (2006.01)
*G01L 19/00* (2006.01)
*G01F 1/34* (2006.01)
*B01D 5/00* (2006.01)
*F16L 23/024* (2006.01)
*F16L 23/032* (2006.01)
*G01L 13/00* (2006.01)

(52) U.S. Cl.
CPC ............ *G01F 15/18* (2013.01); *G01L 19/003* (2013.01); *G01L 19/0015* (2013.01); *G01L 19/06* (2013.01); *G01L 19/14* (2013.01); *G01L 13/00* (2013.01); *Y10T 137/5196* (2015.04); *Y10T 137/87249* (2015.04); *Y10T 137/87885* (2015.04)

(56) References Cited

U.S. PATENT DOCUMENTS

| | | | | |
|---|---|---|---|---|
| 5,988,203 A | * | 11/1999 | Hutton | G01F 1/36 137/271 |
| 6,272,931 B1 | | 8/2001 | Nimberger | |
| 2002/0162309 A1 | * | 11/2002 | Schmitz | B01D 46/0001 55/423 |
| 2013/0327157 A1 | * | 12/2013 | Verhaagen | F16L 23/02 73/861.61 |
| 2018/0242883 A1 | * | 8/2018 | Friberg | A61B 5/0876 |

* cited by examiner

SELF-DRAINING MOUNT HEAD FOR TRANSMITTER

BACKGROUND

The present disclosure relates to pressure transmitter flow meter connections. More specifically, the invention relates to a self-draining head configuration.

Flow measurement of process fluids such as steam and caustic or dangerous fluids can cause many unique challenges, one of which is common when steam is measured in cold ambient environments. When flow of the steam stops, water trapped by surface tension in the differential pressure ports of a transmitter mount head, or near the diaphragm of the transmitter, can freeze and damage the transmitter, head, or flow meter.

In many differential pressure flow applications it is desirable for process fluids to drain away from the transmitter and back into the process conduit when process flow is stopped. The most common scenario with this requirement is water or steam flow in cold ambient environments where shutting down flow could allow trapped water to freeze, expand, and damage sensitive meter components. It is also desirable for applications with flow of corrosive or other dangerous fluids to self-drain during a shutdown. With current designs, mounting the flow meter with the transmitter above the process conduit does not guarantee that process fluid will drain back into the pipe. The passages in the impulse tubes and ports in the current head and/or manifold have diameters that are small enough that the mass of the fluid within may not overcome the surface tension of the fluid, and thus it will remain trapped, even after process flow stops.

A common process fluid that can cause problems in harsh environments, especially those that are subjected to cold temperatures (e.g., cold enough to freeze water), is steam. In cold temperatures, steam condenses to water, and that water can freeze in head passages, and near diaphragms of a pressure transmitter, causing a number of potential issues including damage to the process transmitter and its components, plugging of the process fluid passages, or the like.

One proposed solution for process fluid being trapped near a transmitter diaphragm or within the head or flow meter is to increase the diameters of process fluid passages on a standard head. Another attempt at avoiding damage caused from freezing water is to create an instrument with geometry that allows water to drain away from the transmitter back into the main process line. Such a "straight drain" design does increase the amount of drainage, but water will only drain out of the impulse tubes, not the head of the meter due to small internal passages and cross-drill head geometry. In such a design, damage to the transmitter caused from freezing water has not been fully mitigated. First, traditional equalizer and isolation valves use small diameter passages in order to properly seal. Second, due to the angles of internal passageways within transmitter mount heads, process fluid will only drain if the transmitter is oriented vertically upward, even with increased diameters. Vertical installation is not feasible for many piping installations.

Therefore, currently, the most common method used to protect a flow meter from freeze damage is heat tracing or steam tracing systems. Both of these techniques are expensive to install, operate, and maintain. For example, differential pressure flow is a desirable technology for measuring steam due to its inherent reliability, wide industry acceptance, and high temperature ranges. Approximately 45% of all energy is used to create steam and approximately 70% or more of all steam measurements use differential pressure flow technology. Many of these measurement points are in ambient environments that use heat tracing or steam tracing to prevent the condensate trapped in the primary element head from freezing and damaging the transmitters due to potentially cold ambient air temperatures. During installation, each steam trace installation for a single flow measurement installation can cost on the order or $1500 to $3000. When maintenance and operational costs are included, this cost is significantly higher.

SUMMARY

A self-draining transmitter mount head includes a head body with a transmitter process coupling port in the head body, an impulse port in the head body, and an impulse passage coupled to the impulse port. An impulse drain passage is coupled between the pressure transmitter port and the impulse passage. The impulse drain passage is positioned at an angle to the impulse passage, and relative to a head installation angle that positions the impulse drain passage to drain away from the transmitter process coupling port through a range of head installation angles.

Another self-draining transmitter mount head includes a head body, a pair of differential transmitter process coupling ports in the head body, and a pair of impulse ports in the head body. A pair of impulse passages couple to the respective impulse ports. A pair of impulse drain passages couple at an angle between the respective differential transmitter process coupling ports and the respective impulse passages. The angled impulse drain passages are configured to drain away from the differential transmitter process coupling ports through a range of head installation angles.

A method of installing a self-draining transmitter mount head is provided including mounting the head in an orientation to allow internal draining of process fluid within the head away from a transmitter process coupling port when process flow stops. Mounting the head further includes mounting within a range of orientations to position angled drain passages in the head to drain process fluid out of the head.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION

Embodiments of the present disclosure provide a direct mount transmitter connection platform, referred to as the head, preferably for a differential pressure flow meter that allows water to fully drain out of the instrument by force of gravity when the transmitter is positioned above the pipe. A head which allows water to completely and automatically drain during a shutdown reduces or eliminates the need for expensive and high-maintenance heat tracing in cold environments and the potential of freeze damage when heat tracing is not present. Embodiments of the disclosure completely drain water from the transmitter and head when mounted within a specified orientation range with a transmitter mounted directly to the head. One benefit of this invention is significantly decreased total installed flow measurement costs and maintenance costs by reducing or eliminating the need to heat or steam trace measurement points.

When process fluid that is being measured is subject to freezing, such as steam in cold ambient environments, such steam in a system including, for example, a pressure transmitter, head, and impulse tubes, may not fully drain back to the process conduit, or may not drain to a point in the system that can safely freeze without damaging the transmitter, head, or flow meter. Further, when the process fluid for which parameters are being measure is caustic, corrosive, or otherwise dangerous, it is also desirable that such fluid drain completely from the transmitter and head of a system before maintenance is performed. In many situations, it is not possible to install a process variable measurement system in an orientation that is conducive to full draining of the components of the system. Still further, if even some water remains within the pressure transmitter, head, or flow meter, damage can occur due to freezing, or if some dangerous fluid remains, damage can occur in other ways in addition to freezing. Embodiments of the present disclosure include passages to facilitate self-draining of process fluid from the pressure transmitter, head, and flow meter.

When flow of a stream of process fluid stops in a typical head and transmitter system, water from condensed steam is often trapped in internal passages, for example by geometry, or by their orientation with respect to one or more of gravitational forces, surface tension, capillary effect, and the like. Simply enlarging the diameter of passages is not sufficient to allow for full drainage of process fluid from the system, since equalizer and isolation valves typically use small diameter passages to allow for proper sealing, and angles in passages allow drainage only if the transmitter is oriented vertically upward. Installations are not always capable of being oriented vertically, and therefore, such a system is susceptible to incomplete draining even with large diameter passages.

Figure 1:
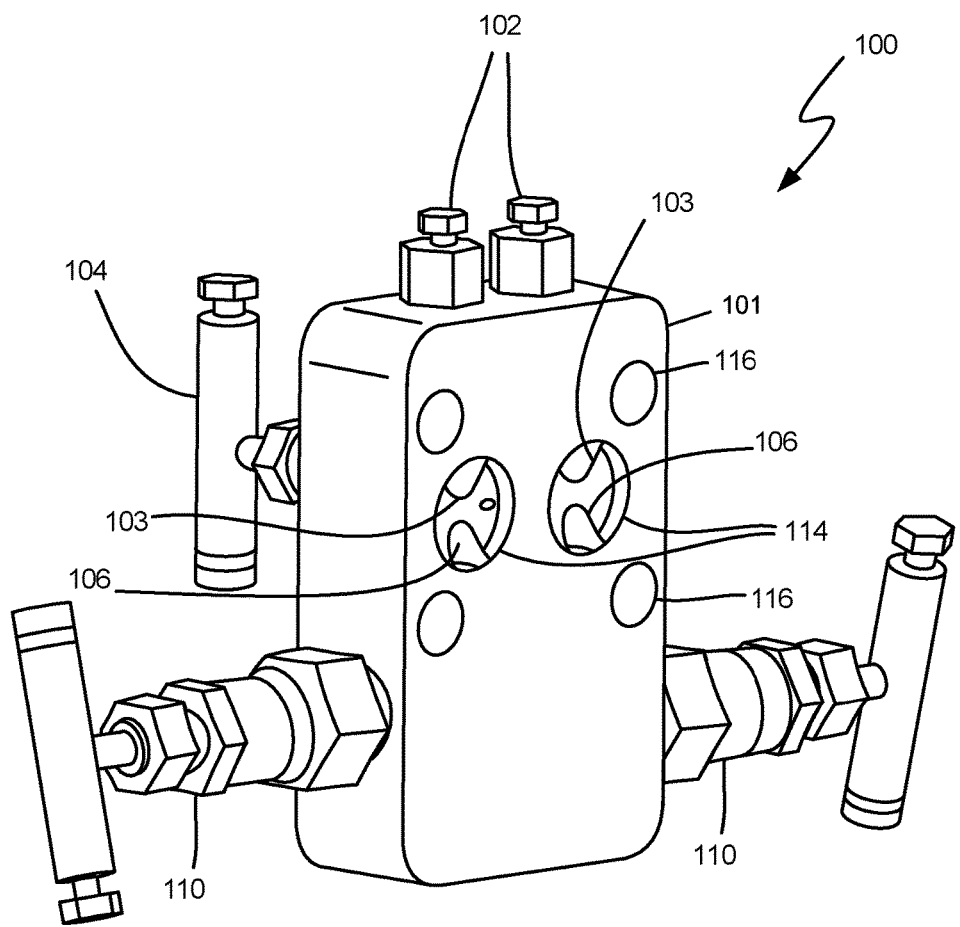
FIG. 1 is a perspective view of a self-draining head according to an embodiment of the present disclosure.

FIG. 1 shows a self-draining head 100 according to an embodiment of the present disclosure. Head 100 as shown in FIG. 1 comprise in one embodiment a head body 101, drain/vent plugs 102, an equalizer valve 104, isolation valves 110, transmitter mount holes 116, transmitter process coupling ports 114, internal drain/vent drain passages 103, and impulse drain passages 106. Further elements of embodiments of the present disclosure are shown in further figures. For differential pressure measurement, two impulse passages and two impulse drain passages may be coupled between two impulse ports (FIG. 2) and two transmitter process coupling ports 114. For static pressure measurement, a single impulse passage and impulse drain passage may be coupled between a single impulse port and a single transmitter process coupling port. Although two isolation valves and an equalizer valve are shown, it should be understood that more or fewer valves (including zero) may be used, and that a different number of internal passages may be used for various other head configurations without departing from the scope of the disclosure.

Figure 2:
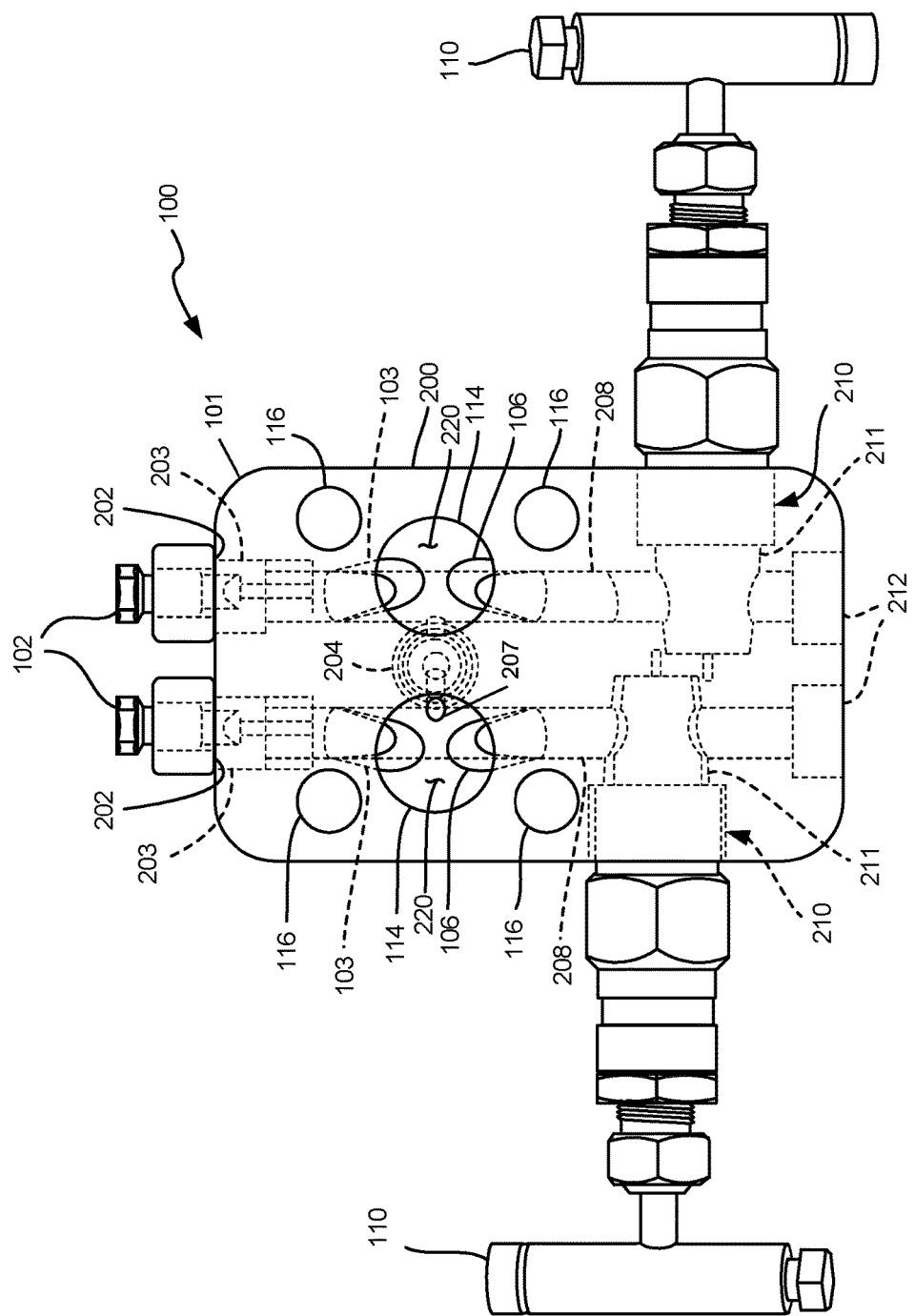
FIG. 2 shows the head of FIG. 1 in elevation, with internal passages indicated by broken lines.
Figure 6:
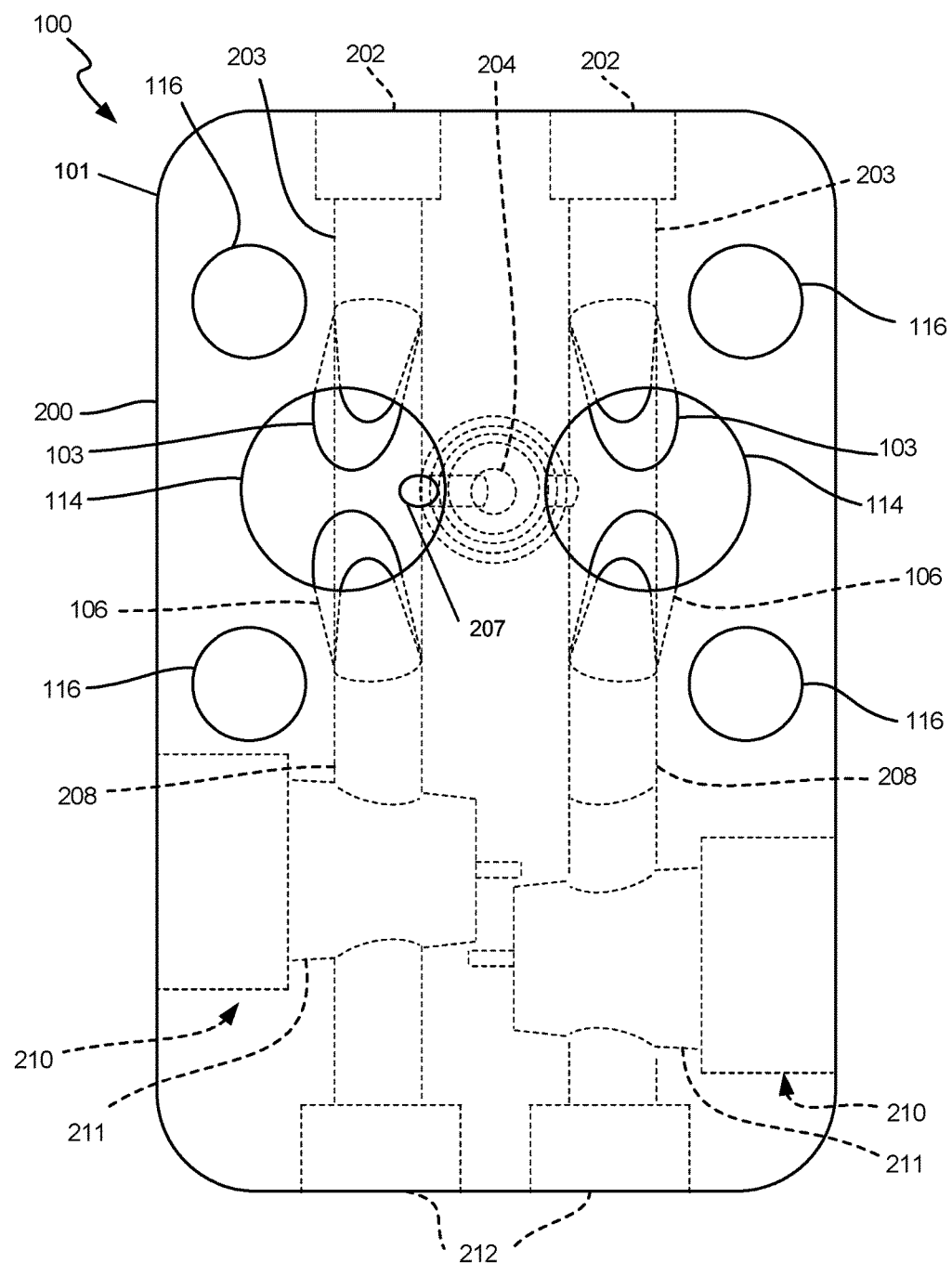
FIG. 6 is a more detailed view of the head of FIG. 1.

FIG. 2 is an elevation view of self-draining head 100 showing internal passages of the head 100 in body 200 using dashed lines. FIG. 6 is a larger view of the body 200 of head 100 also showing internal passages of the head 100 using dashed lines, but omitting the external components of head 100 for purposes of clarity. As is shown in the embodiment of FIGS. 2 and 6, self-draining head further comprises ports 202 for receipt of drain/vent plugs 102, equalizer seat port 204 coupleable to equalizer valve 104 and coupled to the impulse passage via an equalizer passage 207, isolation valve ports 210 coupleable to isolation valves 110, and impulse ports 212 coupleable to impulse tubing and/or process measurement devices. Ports 202 are the openings to drain/vent passages 203 that lead to angled drain/vent drain passages 103. Passages 103 are coupled to transmitter process ports 114 and to impulse passages 208. Impulse ports 212 are the openings to impulse passages 208 that lead to isolation valve ports 210 and then to angled impulse drain passages 106. Angled impulse drain passages 106 are coupled to transmitter process ports 114.

Impulse passages 208 and drain/vent passages 203 are also coupled, in one embodiment, in a straight line so as to allow for the combined passages 203 and 208 to facilitate easy clean out with a rod-out tool in order to allow for clearance of obstructions and the like within the passages 203 and/or 208. The large diameter internal geometry and impulse tubes of the head 100 facilitate easy clean out with a rod-out tool. In this embodiment, the ports 202 and 212 allow a rod-out tool to pass through the entire length of the impulse and drain/vent passages 208, 203 and clean out any build up or debris. While drain/vent plugs 102, drain/vent passages 203, and angled drain/vent drain passages 103 are shown in the figures, the drain/vent drain passages 103 and/or drain/vent passages 203 may be omitted without departing from the scope of the disclosure. In one embodiment, the drain/vent drain passages 103 and impulse drain passages 106 are angled with respect to the drain/vent passages 203 and impulse passages 208, respectively, at an angle of approximately 135° toward the transmitter process ports 114, to allow for the drainage described herein. However, it should be understood that different angles may be used for different drainage orientation ranges without departing from the scope of the disclosure.

Isolation valve ports 210 in one embodiment are sufficiently large so as to allow process fluid to drain from the head 100, and in one embodiment comprise bonnet seats 211 which allow isolation valve inner diameters to be self-draining. The bonnet seats 211 in one embodiment hold full port rising plug bonnets for primary isolation, and are large enough so that inner diameter isolation valves 110 may be self-draining, in one embodiment the same diameter as the passages 103, 106, 203, and 208.

Adjacent the differential connections 114, the passages 103, 106, 203, and 208 meet at a diaphragm clearance chamber 220. At this chamber 220, the impulse passages 208 intercept the chamber 220 at a point within the head 100 that is at the lowest point of the chamber 220 in one embodiment, to further facilitate drainage away from a diaphragm of the pressure transmitter.

While circular diameter passages are shown in the figures, it should be understood that other shaped passages may be employed without departing from the scope of the disclosure. For example, angled slots may be employed instead of angled circular diameter passages. Still further, grooves may be incorporated into one or more of the passages of the head embodiments to further decrease tension forces from the process fluid and to promote draining through smaller diameter passages.

Figure 3:
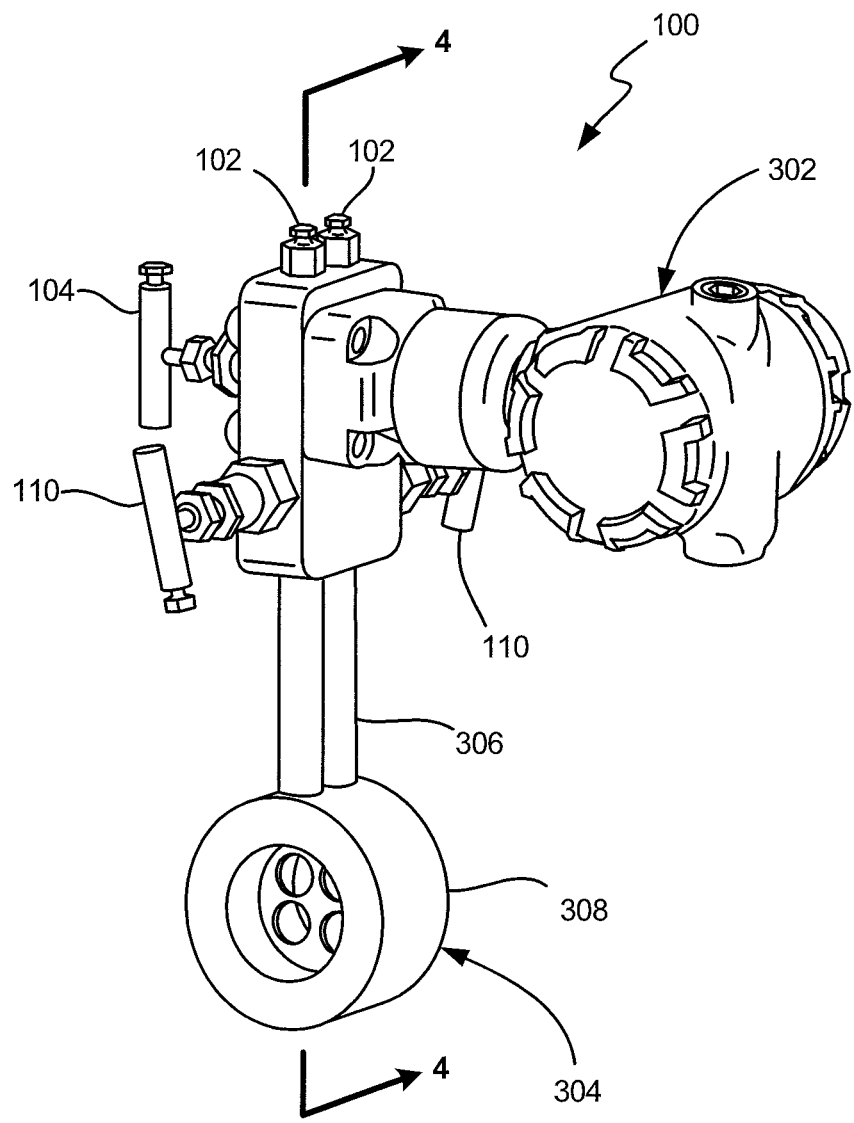
FIG. 3 is a perspective view of the -draining head of FIG. 1 with a mounted pressure variable transmitter and straight drain tubes according to another embodiment of the present disclosure.

FIG. 3 illustrates a perspective view of a head 100 connected to a pressure transmitter 302 and primary element 304, illustrated as an orifice plate, but which can be another type of primary element without departing from the scope of the disclosure. Pressure transmitter in one embodiment is a differential pressure monitor and transmitter that connects to the head 100 at mount holes 116, and couples to the process at transmitter process ports 114. Primary element 304 connects to the impulse ports 212 of head 100 through process connections 306, in one embodiment impulse tubes, to couple process fluid to the head 100 and ultimately to the process transmitter 302 for measurement of process variables such as, but not limited to, differential pressures. The various head embodiments disclosed herein may also be applied to static pressure measurements and coupled static pressure transmitters. As is also shown in FIG. 3, the geometry of the head 100 preferably allows for direct mount of a pressure transmitter 302 or manifold to the head 100.

Head 100 has internal passages and design to facilitate self-draining of the pressure transmitter, head, and flow meter as described herein. Specifically, in one embodiment, head passages 103 and 106 are arranged and configured at angles to the transmitter differential connections and transmitter passages, and also at angles to internal passages 203 and 208, so as to allow drainage of process fluid from the system in operating orientations (see FIGS. 2, 6, and 11).

Figure 4:
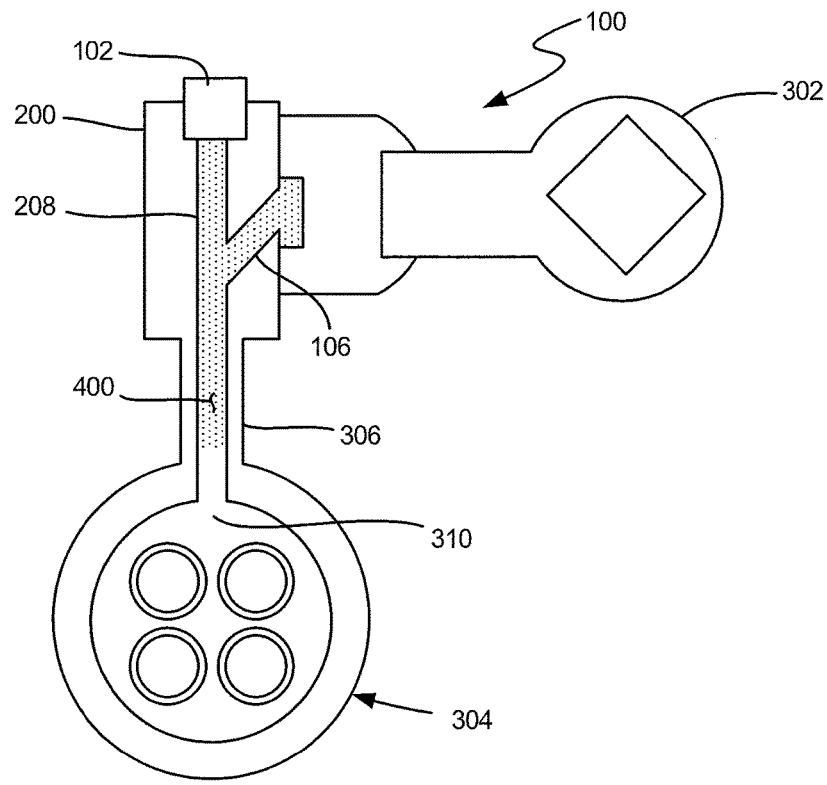
FIG. 4 is a sectional view of the embodiment of FIG. 3 taken along lines 3-3 thereof.

FIG. 4 is a sectional view of the embodiment of FIG. 3, and includes self-draining head 100 mounted to a pressure transmitter 302 and a primary element 304. The combination is shown in a steam on top mounting orientation in which the pressure transmitter is substantially horizontal, and the impulse tubing from the head 100 and the primary element 304 are substantially vertical. The angle of the impulse drain passages 106 allows fluid 400 within the transmitter 302 to flow away from the transmitter, down angled impulse drain passages 106, to drain through impulse passages 208, to the process conduit through opening 310 to primary element 304, which is positioned in use within a process flow conduit. The angled impulse drain passages 106 are of suitable diameter to allow accumulated fluid to overcome surface tension and capillary effects to drain away from the transmitter 302 and through the head 100 to a location where the fluid will not damage the system should it freeze, or will not damage the system due to corrosion or other properties of dangerous fluids.

Figure 5:
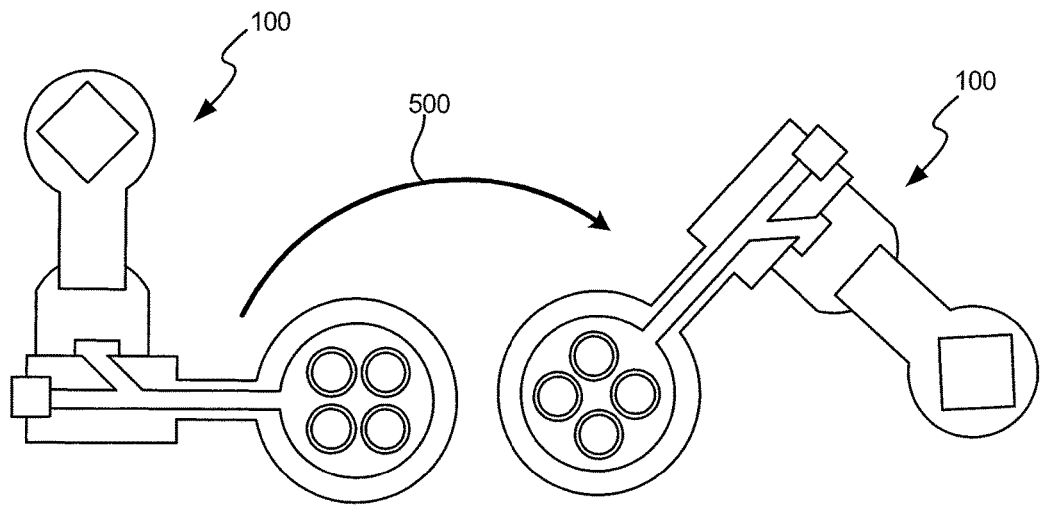
FIG. 5 is a view showing a range of mountings for a self-draining head according to embodiments of the present disclosure.

The angled nature of the impulse drain passages 106 with respect to the transmitter 302 and the impulse passages 208 allows for installation of the head 100 within a wide range of angular steam on top orientations, as shown in FIG. 5. FIG. 5 shows a range of installation orientations along arrow 500 in which the head 100 may be installed and still allow drainage of process fluid away from the transmitter 302 and head 100 when process flow stops. In the orientations from the left orientation of FIG. 5 to the right orientation of FIG. 5, along arrow 500, fluid will drain away from the transmitter diaphragm and out the head 100 due to the angles and size of the passages in the head 100. The head 100 with the arrangement of passages shown facilitates draining of process fluid within a 135° mounting range of operation.

Figure 10:
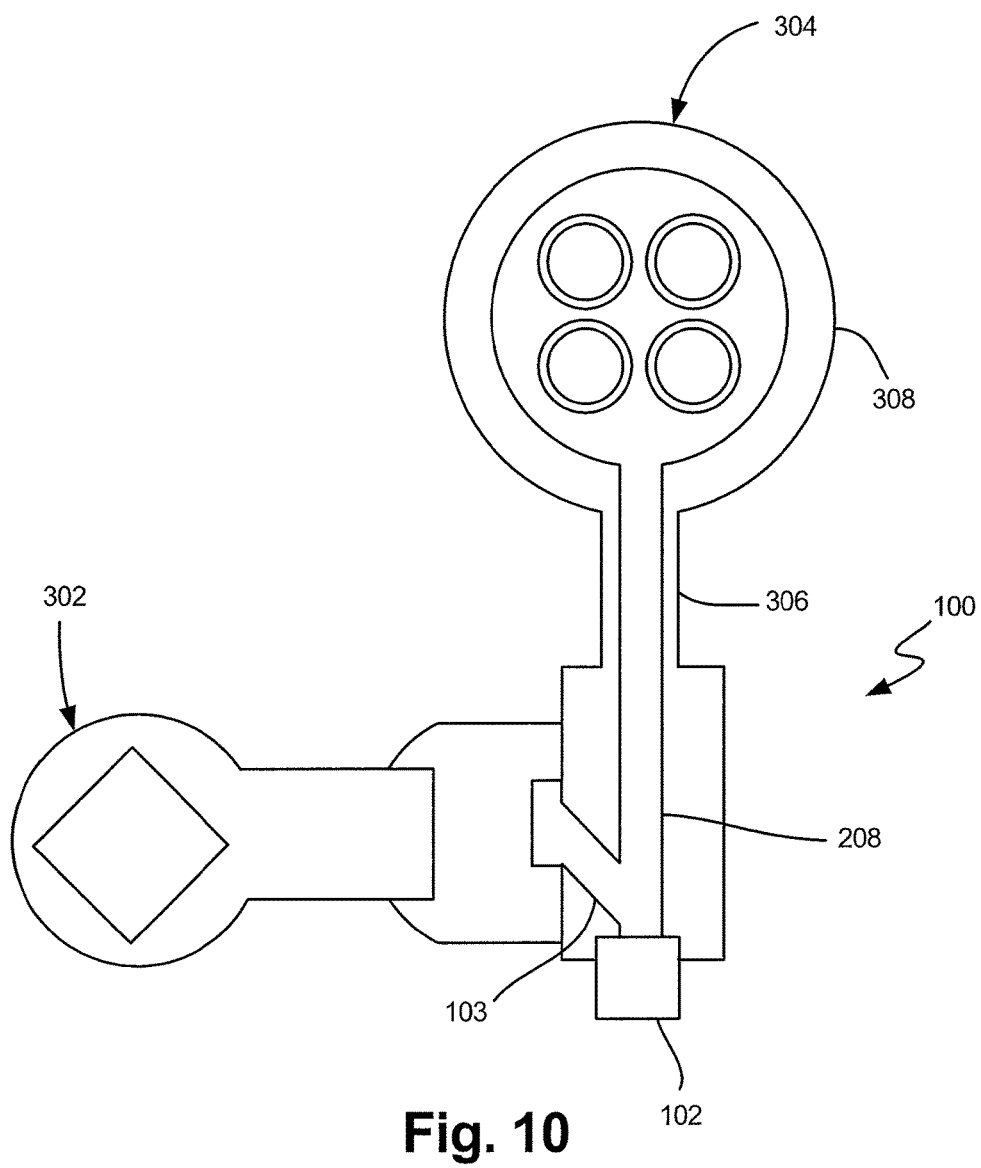
FIG. 10 is a view of the head of FIG. 4 in an inverted position.
Figure 11:
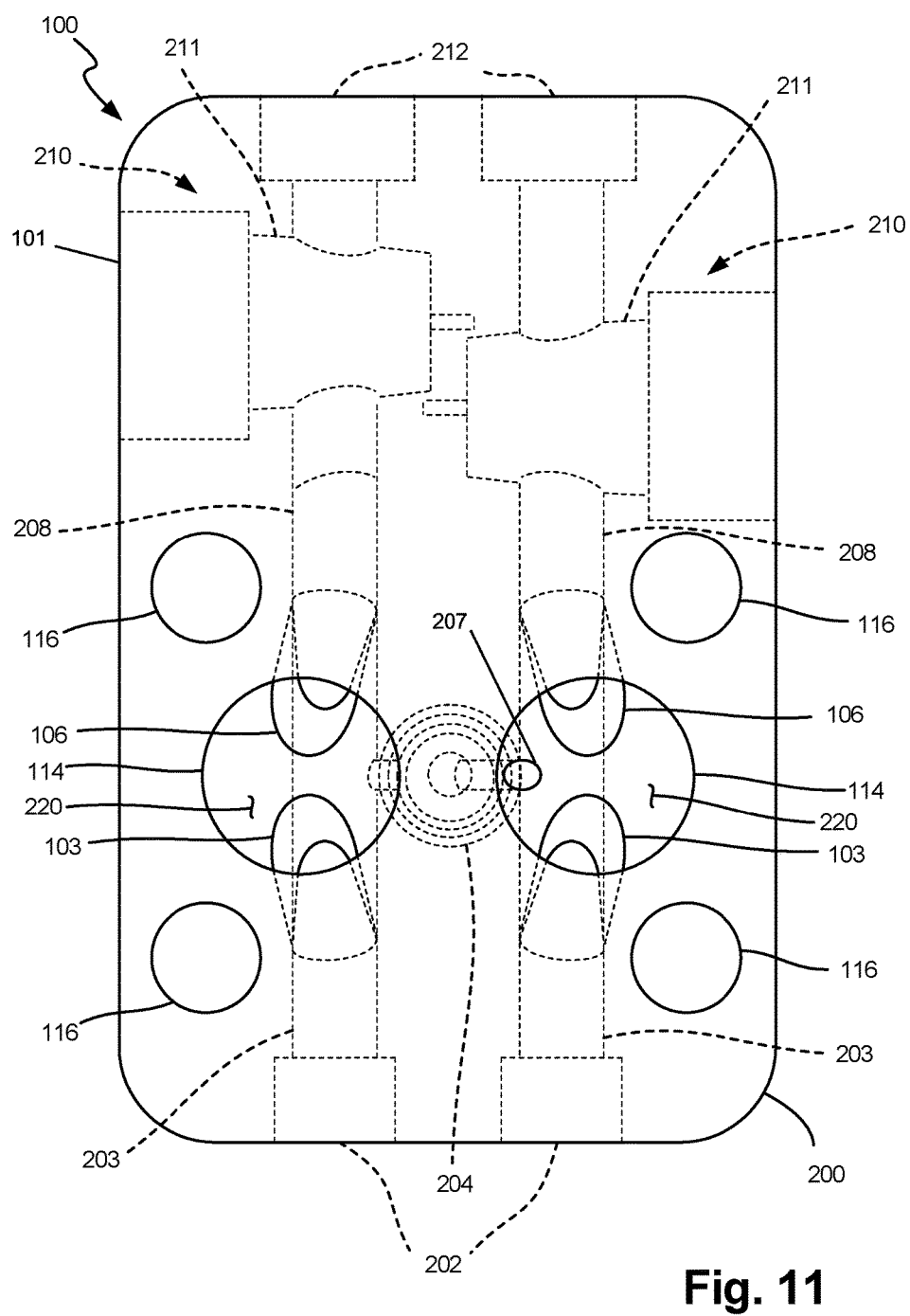
FIG. 11 is a more detailed view of the head of FIG. 1 in an inverted position.

Further, if the head 100 were welded to the impulse tubes in the opposite direction, e.g., beneath a process conduit, as shown in FIGS. 10-11, a mirrored 135° mounting range is available. With this installation orientation, the drain/vent plugs 102 may be removed to allow drainage of process fluid away from the transmitter 302 via drain/vent drain passages 103 and drain/vent passages 203. In such a range of mounting orientation, the passages 103 and 203 are angled and sized so that they act in a fashion similar to passages 106 and 208.

In one embodiment, the equalizer valve 104 and equalizer seat port 204 is of a standard, relatively small, diameter to allow for proper sealing of the equalizer valve. It should be noted that should process fluid be trapped within the equalizer line, this will not affect the transmitter diaphragm since all process fluid will still flow out of the diaphragm area.

In one embodiment, the passages 103, 106, 203, and 208 are sized at or above a diameter to allow the overcoming of surface tension when process fluid accumulates for drainage after a process flow shutdown. In one embodiment, the diameter of the passages 103, 106, 203, and 208 is at least 0.375 inches, although it should be understood that other draining diameters, including those larger or smaller than 0.375 inches, may be employed without departing from the scope of the disclosure.

Figure 7:
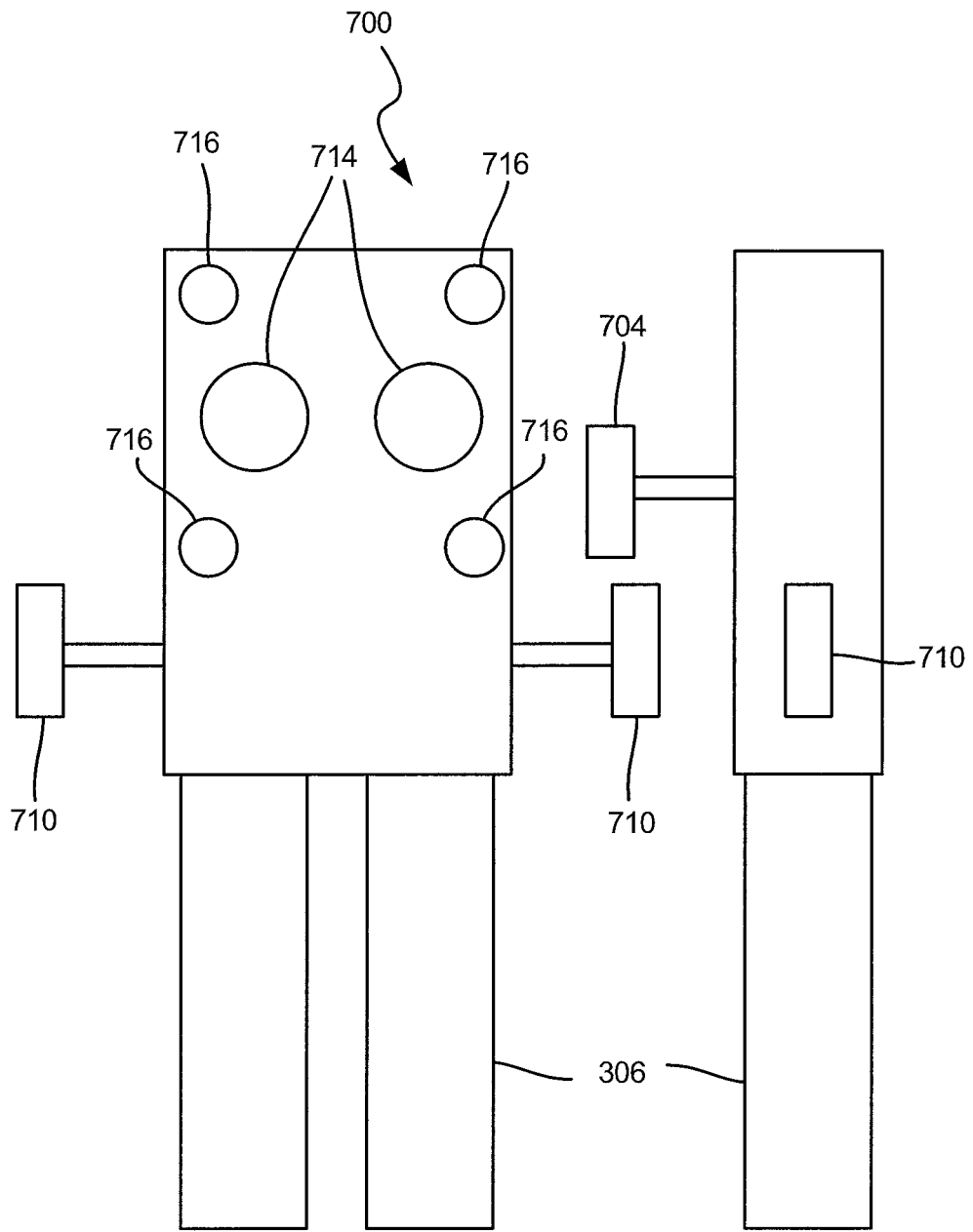
FIG. 7 is a side and front elevation view of a self-draining head according to another embodiment of the present disclosure.
Figure 8:
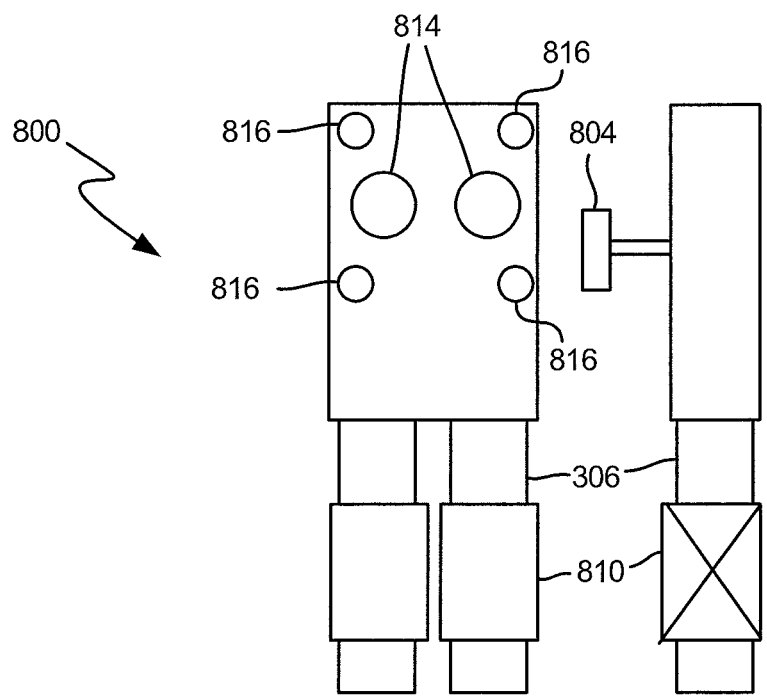
FIG. 8 is a side and front elevation view of a self-draining head according to another embodiment of the present disclosure.
Figure 9:
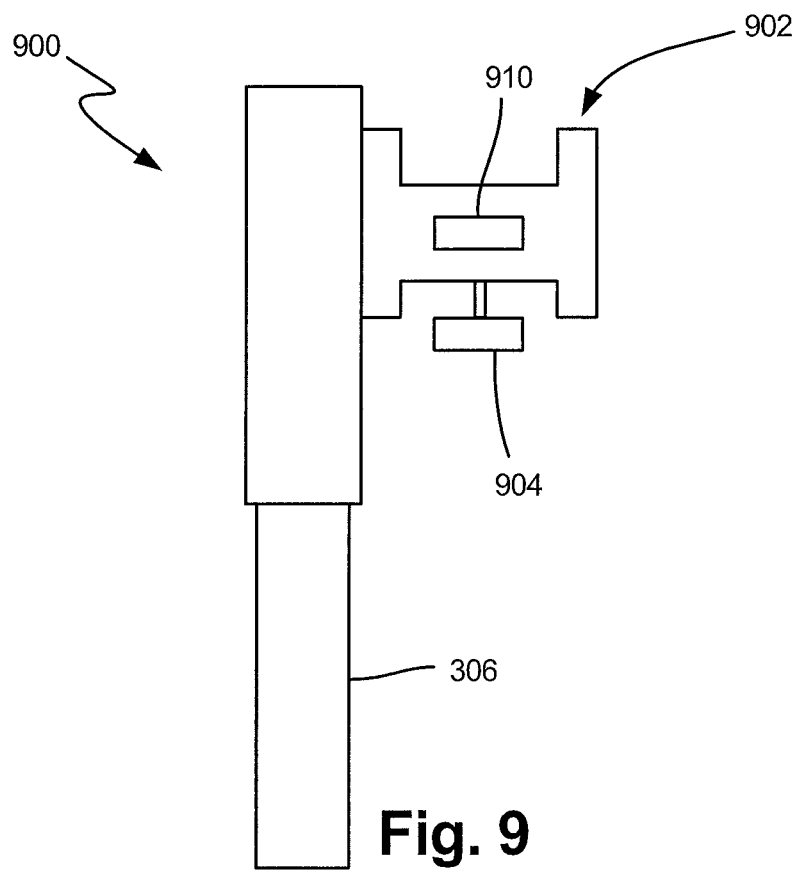
FIG. 9 is a side and front elevation view of a self-draining head according to another embodiment of the present disclosure.

Alternative embodiments of the present disclosure are shown in FIGS. 7-9. FIG. 7 illustrates front and side elevation views of a head 700 according to another embodiment of the present disclosure. Head 700 incorporates isolation valves 710 and an equalizer valve 704, each with bonnets incorporated into the head 700. Mount 700 includes transmitter mount holes 716 and differential connections 714, and connects to a process conduit with impulse tubes 306. Although two isolation valves and an equalizer valve are shown, it should be understood that more or fewer valves and internal passages may be used for various other head configurations without departing from the scope of the disclosure.

FIG. 8 illustrates front and side elevation views of a head 800 according to another embodiment of the present disclosure. Head 800 incorporates an equalizer valve 804 in the head 800, and isolation valves 810 incorporated into impulse tubes 306. Mount 800 includes transmitter mount holes 816 and differential connections 814, and connects to a process conduit with impulse tubes 306. Although two isolation valves and an equalizer valve are shown, it should be understood that more or fewer valves and internal passages may be used for various other head configurations without departing from the scope of the disclosure.

FIG. 9 illustrates a side elevation view of a head 900 according to another embodiment of the present disclosure. Head 900 uses no valves in the head body or impulse tubes 306. Instead, head 900 mounts to a manifold 902 incorporating equalizer valve 904 and isolation valves 910. The manifold is directly mountable to the head 900.

Each of the heads 700, 800, and 900 incorporate internal passages such as those described above in head 100, and are therefore self-draining to the extent of head 100. Further, while heads 100, 700, 800, and 900 illustrate a pair of differential ports and single pressure taps, double pressure taps may be employed for redundancy without departing from the scope of the disclosure.

Embodiments of the present disclosure may be provided with a spool section to allow more space for impulse tubes to meet ISO 5167-2 tap spacing requirements. Impulse tubes may be of extended length to increase heat transfer to ambient air (e.g., cooling).

Further, because the embodiments of the present disclosure may frequently be employed in steam applications, optional heat sink additions to the heads may be used to assist in the transfer of heat from the process fluid to ambient air. Heat sink geometry may be chosen to increase surface area of the head and/or impulse tubes, such as by providing fin features. In embodiments with extremely hot process temperature, the heads of the various embodiments may incorporate a cooling jacket in which a heat transfer fluid is pumped through the head to remove heat from the components.

Although the present invention has been described with reference to preferred embodiments, workers skilled in the art will recognize that changes may be made in form and detail without departing from the spirit and scope of the invention.

What is claimed is:

1. A self-draining transmitter mount head, comprising:
   a head body;
   a transmitter process coupling port in the head body;
   an impulse port in the head body;
   an impulse passage coupled to the impulse port;
   an impulse drain passage coupled between the transmitter process coupling port and the impulse passage, the impulse drain passage positioned at an angle to the impulse passage, and relative to a head installation angle that positions the impulse drain passage to drain away from the transmitter process coupling port through a range of head installation angles;
   a drain/vent port in the head body, the drain/vent port coupled to the impulse passage, wherein the impulse passage is coupled in a straight line between the drain/vent port and the impulse port;
   a removable drain/vent plug configured to seal the drain/vent port; and
   a drain/vent passage coupled between the drain/vent port and the impulse passage.

2. The self-draining head of claim 1, and further comprising:
   an equalizer seat port in the body, the equalizer seat port coupled to an equalizer passage coupled to the impulse passage; and
   an equalizer valve coupled to the equalizer port.

3. The self-draining head of claim 1, and further comprising:
   an isolation valve port in the body, the isolation valve port coupled to the impulse passage; and
   an isolation valve coupled to the isolation valve port.

4. The self-draining head of claim 3, wherein the isolation valve is a self-draining valve.

5. The self-draining head of claim 4, wherein the head further comprises a bonnet seat in which the isolation valve is seated for self-draining, the bonnet seat comprising a full port rising plug bonnet.

6. The self-draining head of claim 1, wherein:
   the transmitter process coupling port comprises first and second differential ports, the impulse passage comprises a pair of impulse passages, the impulse drain passage comprises first and second impulse drain passages, the impulse port comprises first and second impulse ports, wherein the first differential port is coupled to the first impulse port by the first impulse passage and the first impulse drain passage, and the second differential port is coupled to the second impulse port by the second impulse drain passage and the second impulse passage; and
   the head is configured for differential pressure measurement.

7. The self-draining head of claim 1, wherein the drain/vent passage coupled between the transmitter process coupling port and the impulse passage is positioned at an angle to the impulse passage, and relative to a second head installation angle that positions the drain/vent passage to drain away from the transmitter process coupling port through a second range of head installation angles 180 degrees opposite the head installation angle.

8. The self-draining head of claim 1, wherein the range of installation angles is approximately 135 degrees.

9. The self-draining head of claim 1, wherein each of the impulse passage and the impulse drain passage have a diameter of at least 0.375 inches.

10. The self-draining head of claim 1, and further comprising a cooling element for the head.

11. The self-draining head of claim 10, wherein the cooling element comprises at least one heat sink fin coupled to the head body.

12. The self-draining head of claim 10, wherein the cooling element comprises at least one cooling passage through the head body, the at least one cooling passage coupleable to a heat transfer fluid to remove heat from the head body.

13. The self-draining head of claim 1, wherein at least one of the impulse passage and the impulse drain passage include at least one groove positioned along a longitudinal length thereof.

14. The self-draining head of claim 1, wherein the impulse passage and the impulse drain passage are coupled to a chamber, the chamber adjacent the transmitter process coupling port, and the impulse passage couples to the chamber at a lowest point in the chamber when the head is installed in a head installation angle within the range of head installation angles.

15. The self-draining head of claim 1, wherein the impulse passage and impulse drain passage are of sufficient diameter to overcome surface tension of a mass of water in the passages under gravitational force at a head installation angle within the range of head installation angles.

16. The self-draining head of claim 1, wherein the head is configured to be mounted directly to a pressure transmitter.

17. The self-draining head of claim 1, wherein the head is integrally formed with impulse lines and a primary element.

18. A self-draining transmitter mount head, comprising:
   a head body;
   a pair of differential transmitter process coupling ports in the head body;
   a pair of impulse ports in the head body;

a pair of impulse passages, wherein a first of the impulse passages is coupled to a first of the impulse ports, and a second of the impulse passages is coupled to a second of the impulse ports;

a pair of impulse drain passages, wherein a first impulse drain passage is coupled at an angle between the first differential transmitter process coupling port and the first impulse passage, and a second impulse drain passage is coupled at an angle between the second differential transmitter process coupling port and the second impulse passage;

wherein the angled impulse drain passages are configured to drain away from the differential transmitter process coupling ports through a range of head installation angles a pair of drain/vent ports in the head body;

a removable drain/vent plug configured to seal each drain/vent port; and a pair of drain/vent passages, a first drain/vent passage coupled between a first of the respective drain/vent ports and the first impulse passage, and a second drain/vent passage coupled between a second of the respective drain/vent ports and the second impulse passage;

wherein each drain/vent passage is aligned with and coupled in a straight line to its respective impulse passage.

19. The self-draining head of claim 18, and further comprising:

a pair of drain/vent drain passages, a first drain/vent drain passage coupled at an angle between the first drain/vent passage and the first differential transmitter process coupling port, a second drain/vent drain passage coupled at an angle between the second drain/vent passage and the second differential transmitter process coupling port, each drain/vent drain passage angled relative to a second head installation angle that positions the drain/vent drain passage to drain away from the pressure transmitter coupling through a second range of head installation angles 180 degrees opposite the head installation angle.

20. A method of installing a self-draining transmitter mount head, comprising:

mounting the head in an orientation to allow internal draining of process fluid within the head away from a transmitter process coupling port when process flow stops;

wherein mounting the head further comprises mounting within a first range of orientations to position angled drain passages in the head to drain process fluid out of the head;

wherein mounting the head further comprises mounting to allow a second range of orientations to position angled drain/vent passages to drain away from the transmitter process coupling port through the second range of orientation angles 180 degrees opposite the mounted head orientation; and wherein the angled drain passages and the angled drain/vent passages drain to an impulse passage coupled in a straight line between impulse ports and drain/vent ports in the head.

* * * * *